United States Patent Office 3,234,923
Patented Feb. 15, 1966

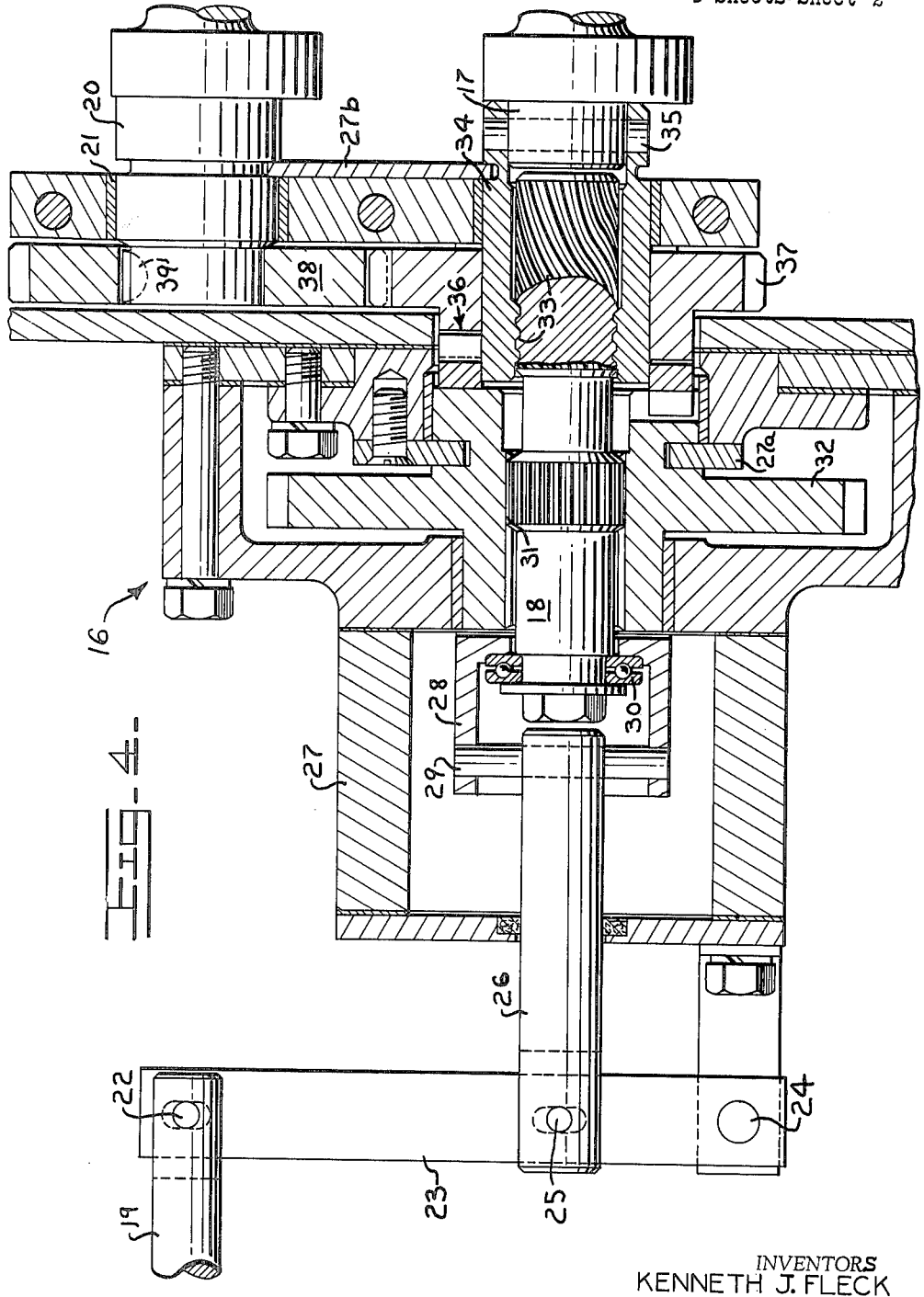

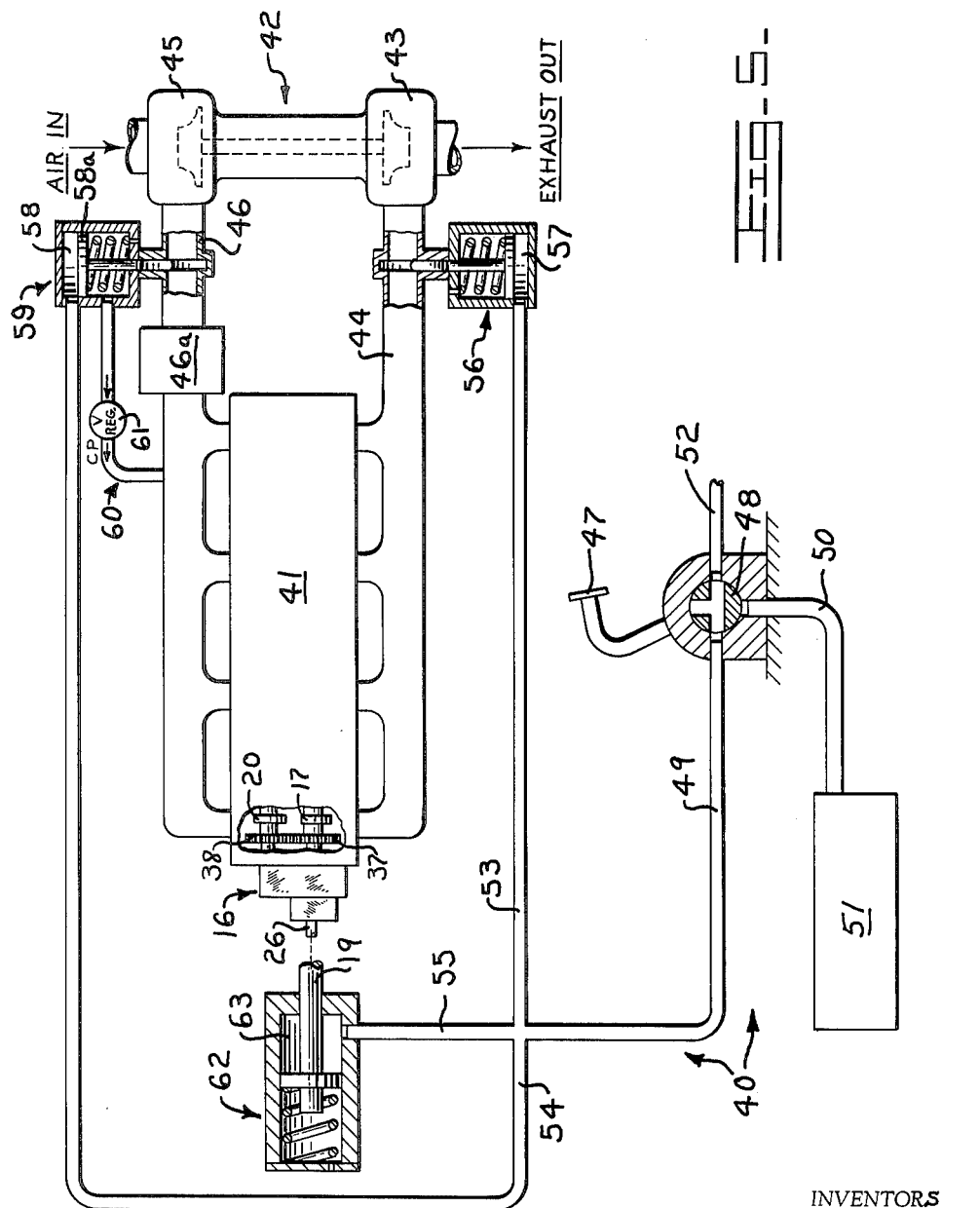

3,234,923
METHOD AND BRAKING SYSTEM FOR INTERNAL COMBUSTION ENGINES
Kenneth J. Fleck, Peoria, and John M. Bailey, East Peoria, Ill., assignors to Caterpillar Tractor Co., Peoria, Ill., a corporation of California
Filed June 18, 1962, Ser. No. 203,251
9 Claims. (Cl. 123—97)

This invention relates to a method and braking system for internal combustion engines and more particularly relates to a compression brake which advances exhaust valve cam shaft timing to increase the braking efficiency of an internal combustion engine.

The problem of braking vehicles having internal combustion engines is particularly important where the vehicle is engaged in pronounced down grade travel. The demand for increased size and load carrying capacities of present day vehicles has provided the need for an immediate solution to this problem. The larger type vehicles generally employ diesel engines which engines further add to this problem. For example, during many low load conditions of diesel engine operation, air is freely permitted to flow into the combustion chambers thereof and remains virtually unthrottled. Thus, during such conditions free piston travel is substantially maintained, primarily due to the negligible or no vacuum engine conditions which occur during the engine intake stroke. Furthermore, supercharged diesel engines function to create a positive pressure rather than a vacuum in the intake manifold of the engine to afford even a greater freedom of piston movement.

Many solutions to this braking problem have been attempted. Enlargement of the effective braking surfaces of vehicle wheels and the use of present day compression brakes afford only partial remedies to this problem. For example, provision has been made to selectively shut off the exhaust manifold during particular phases of engine opertion. Such a typical solution generally does not provide for the desired maximum increase in engine braking efficiency. Also, such a method and structure is generally complex in nature and prone to failure.

The present invention has overcome many of the above mentioned difficulties by providing an efficient method and compression brake system for internal combustion engines. The system comprises a control means operatively connected to the exhaust valve cam shaft of the engine for selectively effecting an advanced timing thereof, relative to the intake valve cam shaft and may be further employed to form closed chambers with the intake and exhaust manifolds. This arrangement provides that the combustible mixture necessitated for the compression and expansion phases of normal engine operation is discharged into the exhaust manifold chamber instead of being directed to the piston. Such an arrangement further provides for a return of the discharged mixture to the combustion chamber from the exhaust manifold where it is again compressed on a stroke which is normally the exhaust stroke. This compressed mixture is then discharged into the intake manifold chamber when the intake valve is opened after which the cycle is repeated. Such an arrangement provides for a pulsating action between the intake and exhaust manifold chambers which permits twice the number of normal compression strokes to be obtained, to thus increase braking efficiency.

An object of this invention is to provide a method and means for increasing the braking efficiency of an internal combustion engine.

Another object of this invention is to increase the number of compression strokes in excess of those normally obtained in an internal combustion engine to thereby increase the braking efficiency thereof.

A further object of this invention is to provide a braking system which may be applied to conventional internal combustion engines without affecting the normal operation of the intake valves thereof.

A still further object of this invention is to provide a braking system for internal combustion engines which does not require other than a standard engine cooling arrangement.

A still further object of this invention is to provide a braking system for internal combustion engines which is durable and relatively simple in construction and efficient in operation.

Other and more specific objects of this invention will be made apparent from the following description and drawings wherein:

FIG. 1 graphically compares the opening and closing of engine intake and exhaust valves with combustion chamber pressures, as they would occur during normal combustion engine operation;

FIG. 4 is a plan view, partly in cross-section, disclosing a mechanism utilized to advance the timing of the engine exhaust valves; and FIG. 5 is a partially sectioned schematic view disclosing a braking system embodiment of this invention as it would appear in combination with a supercharged internal combustion engine.

Figure 1:
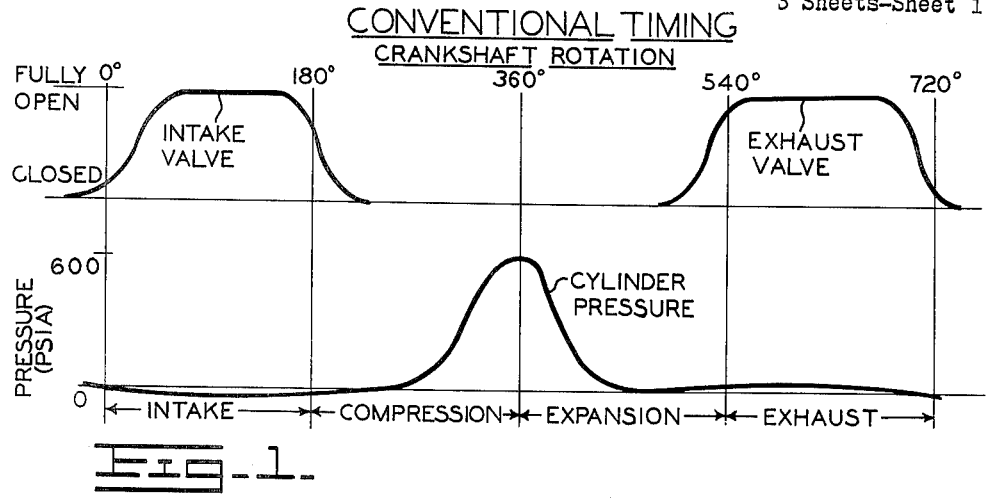

A conventional internal combustion engine would afford performance characteristics similar to those shown in FIG. 1. Although the novel concepts of this invention are particularly adapted for diesel engine application, it should be understood that other types of internal combustion engines may be employed therewith. During the intake, compression, expansion and exhaust phases or one complete cycle of engine operation, the crankshaft of the engine is adapted to make two complete revolutions. During this cycle the engine combustion chamber pressures reach a maximum, such as 600 p.s.i., at the end of the compression phase. The intake and exhaust valves are therein shown as achieving a fully opened position during the intake and exhaust phases, respectively. These open positions are maintained throughout approximately 180° of crankshaft rotation, as indicated by the flattened portions of the curves.

Figure 2:
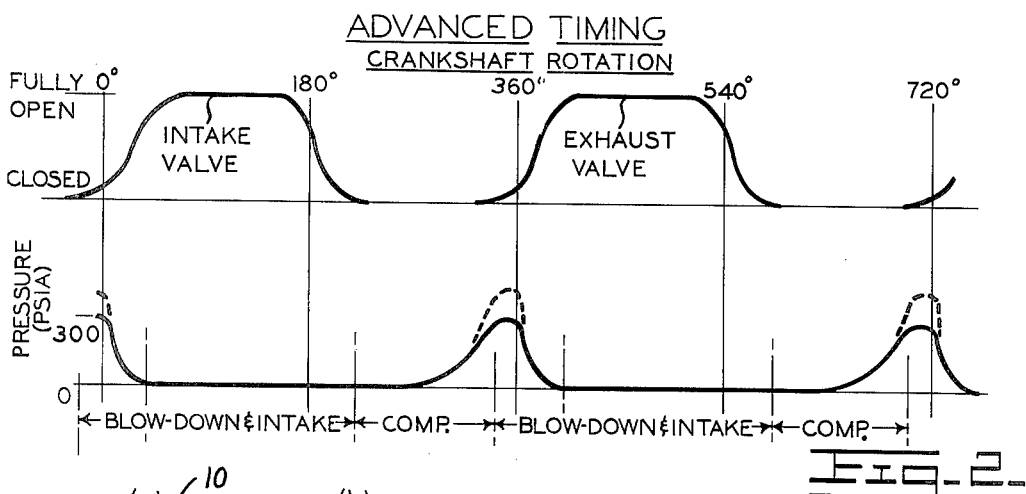
FIG. 2 is a graphical comparison, similar to FIG. 1, disclosing the perimeters of FIG. 1 as they would appear subsequent to an advancement of the exhaust valve timing in accordance with the novel concepts of this invention.

FIG. 2 discloses the performance characteristics which would result pursuant to an advanced timing of the exhaust valve cam shaft in accordance with the novel method concepts of this invention. Although FIG. 2 discloses an approximate 80° advancement (the engine crankshaft normally rotates twice as fast as the cam shafts) of the exhaust valve cam shaft, it should be understood that this invention is not limited to this particular setting. Other advanced settings may be utilized depending on the particular engine application. As therein shown, the normal operation of the intake valve remains the same and only the timing of the exhaust valves is changed.

Figure 3:
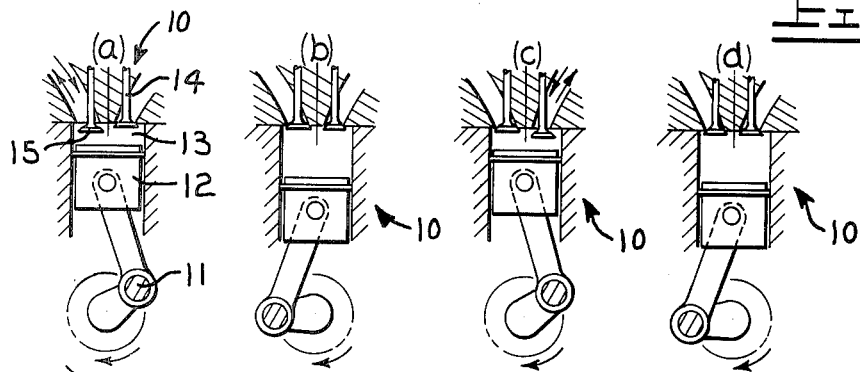
FIG. 3 illustrates a conventional combustion chamber and piston assembly as it would appear during four critical phases of engine operation, as shown in FIG. 2.

FIG. 3 discloses a conventional piston and combustion chamber assembly 10 as having a crankshaft 11, reciprocating piston 12, combustion chamber 13 and exhaust and intake valves 14 and 15. As shown at position (a), while the intake valve is in its open position the gases in the combustion chamber are discharged into the intake manifold chamber to thus decrease the pressure in the combustion chamber to approximately zero. Immediately prior to this phase of engine operation it can be seen that the exhaust gases are highly compressed in chamber 13 which is shown to comprise a small volume relative to the volume of the intake manifold. Thus, a rather large pressure differential is inherently created which permits an expeditious flow of exhaust gases from chamber 13 into the intake manifold. The intake and exhaust manifolds may be formed into closed chambers if so desired to further increase braking efficiency, as will be hereinafter more fully explained. This first phase of engine operation is herein termed a "blow-down and intake" phase. The intake valve then remains open, as in normal operation, and the gases that were previously discharged from the combustion chamber into the intake manifold are sucked back or returned into it, primarily due to the increased volume and thus decreased pressure afforded by the downward travel of the piston.

At position (b), both the intake and exhaust valves are maintained fully closed and the pressure of the gas in the combustion chamber still approximates zero with the piston being in its lower-most position. Proceeding into this first "compression" stage of engine operation, the piston moves in an upwardly direction to top dead center at position (c) to thus compress the gases and increase the pressure in the combustion chamber to approximately 300 p.s.i., for example, for an unboosted system. As will be hereinafter explained in connection with FIG. 5, a boosted system may be employed to substantially increase the braking efficiency of the engine.

At this moment of maximum combustion chamber pressure, a second "blow-down and intake" phase of engine operation commences with the exhaust valve opening to permit the compressed gases to be discharged into the exhaust manifold. The pressure in the combustion chamber is thus again reduced to approximately zero. The exhaust valve then remains in its fully open position as indicated by the flattened portion of this curve. During the latter portion of this condition, i.e. while the exhaust valve remains open, the piston is lowered in the combustion chamber and the gases that were previously discharged into the exhaust manifold are sucked back into the combustion chamber.

These gases are then compressed during the second "compression" stage which commences at position (d). This second "compression" stage would normally constitute the exhaust stage of engine operation. The cycle is then repeated with the pressure in the combustion chamber increasing until the intake valve is subsequently opened. From the above description it can be seen that twice as many compression or braking strokes are afforded than would occur pursuant to normal engine operation. Also, with the above described system only the standard cooling apparatus need be provided at the intake manifold to maintain a relatively cool engine operating temperature.

FIG. 4 discloses a mechanism 16 which may be used for selectively advancing exhaust valve cam shaft timing in accordance with the above discussions. As therein shown, this mechanism essentially comprises an exhaust valve cam shaft 17 having a plurality of cams thereon (only one is shown). The cam shaft may be selectively rotated by means of a rotatable drive shaft 18 which is arranged to receive its adjusting movements from a reciprocating plunger 19. As will be hereinafter more clearly understood, a second or inlet valve cam shaft 20 which is mounted for rotation in a bushing 21, is not rotated during advancement of the exhaust valve cam shaft.

A bifurcated end of plunger 19 is pivotally mounted by a floating pivot arrangement 22 to impart selective swinging movements to a lever 23, about relatively fixed pivot pin 24. A second floating pivot arrangement 25 operatively connects lever 23 with a bifurcated end of a second plunger 26 in order to impart reciprocating movements thereto. The plunger 26 is arranged to extend through a housing 37 and is connected to a reciprocating collar 28 by means of a pin 29. The collar 28 engages and is preferably connected to an inner race of bearing assembly 30 in order to afford reciprocating movements to shaft 18.

A straight spline connection 31 connects shaft 18 to a ring gear 32 which is axially restrained by housing plate 27a. Thus, rotary drive motion and limited axial movement may be imparted to the shaft. The gear 32 operatively connects to an engine crankshaft (not shown) through a suitable gear train (not shown) to receive its actuation therefrom in a conventional manner.

A helical spline connection 33 is formed between shaft 18 and a rotatable and axially restrained bushing 34 to impart selective rotational movements to cam shaft 17. As illustrated, a plate 27b is fixed to the housing 27 and functions to axially restrain the bushing and also the cam shaft 20. The bushing is fixed to the cam shaft by means of a pin 35.

Cam shaft 20 is arranged to receive its rotary motion by means of gear 32 which also drives cam shaft 17. Gear 32 drives shaft through an Oldham coupling 36, an intermediate gear 37 and a driven gear 38 which is keyed at 39 to the cam shaft. The Oldham coupling is used in the conventional manner in order to compensate for misalignment between gears 32 and 37. It should be further noted that gear 37 is mounted for rotation on bushing 34.

In operation, selective actuation of rod 19 in a leftward direction as viewed in FIG. 4, functions to impart a reciprocating movement to shaft 18 also in that direction to thereby rotate bushing 34 by means of the helical spline connection 33. Bushing 34 in turn selectively rotates and advances cam shaft 17 through pin connection 35. As above described, since the straight spline connection 31 does not impart a rotation to gear 32, the rotational position of cam shaft 20 relative to cam shaft 17 will remain unchanged. This condition is further made possible due to the fact that gear 37 is rotatably mounted on bushing 34.

FIG. 5 schematically illustrates a system or control means 40 and engine combination for efficiently actuating the cam shaft advancing mechanism and to substantially increase braking horsepower of the engine over that which would normally be obtained. An engine 41 is operatively connected to a turbocharger 42 which is adapted to have a turbine 43 thereof driven by hot gases received from an engine exhaust manifold 44 in order to drive a compressor 45. Thus, air may be supplied to the engine through intake manifold 46 and aftercooler 46a in a conventional manner.

The system is shown in its neutral or ineffective position, i.e., cam shaft 17 is orientated to its normal operating position. A pedal 47 may be arranged through a suitable connection (not shown) to selectively rotate a three-way valve 48 for communicating an outlet conduit 49 with an inlet conduit 50 which is operatively connected to a pressurized fluid containing tank 51 or a bleed-off conduit 52. The tank 51 may comprise, for example, the pressurized source for actuating the air brakes of the vehicle. When the valve is rotated 90° counterclockwise from the neutral position shown in FIG. 5, pressurized air is permitted to flow through conduits 50, 49, 53, 54 and 55.

The air which flows through conduit 53 functions to pressurize an actuating chamber 57 of a spring biased gate valve assembly 56 to close it in a well known manner. This valve closing action functions to stop the flow of exhaust gases in exhaust manifold 44 and forms a closed chamber therewith. In a like manner, chamber 58 of a gate valve assembly 59 is pressurized to stop the flow of air through the intake manifold 46 and also form a closed chamber therewith. Although the novel exhaust valve cam shaft advancement concepts of this invention, per se, may be utilized to increase braking efficiency of the engine, by utilizing this system which employs closed manifold chambers, a further increase in braking efficiency may be achieved.

The braking efficiency of the engine may be still further increased by providing means for selectively directing additional pressurized gas to either one or both of the above-described closed chamber portions of the manifolds. FIG. 5 illustrates one manner by which such an additional function may be effected to increase the pressure in the closed intake manifold chamber. As therein shown, movement of piston 58a of gate valve assembly 59 to a closed position will afford communication between conduit 54 and a conduit 60 which is arranged in communicating relationship with the closed manifold chamber. Thus, pressurized air from supply tank 51 is permitted to flow into the manifold in response to a closing of the gate valve assembly 59 to further increase braking efficiency. A pressure regulator 61 may be employed in conduit 60 to control the amount of boost being added to the manifold to thus prevent the cylinder pressures from exceeding a predetermined amount. For example, a pressure regulator setting of 20 p.s.i. has been applied to a single cylinder engine and was found to boost cylinder pressure to the dotted line position shown in FIG. 2. This increased pressure was found to increase braking horsepower approximately 50%.

A booster assembly 62 is adapted to have a spring biased piston actuated by means of the pressurized fluid discharged from conduit 55 into chamber 63 thereof. Thus, the hereinabove described compression braking system is free to function in a highly efficient manner. It is preferable to actuate booster assembly 62 in order to advance the timing before the valve means are employed to close the manifolds. Such a desired sequence may be assured by suitably designing the valve and booster biasing springs in accordance with well known design principles.

We claim:

1. A method for increasing braking efficiency during a cycle of internal combustion engine operation, said engine comprising intake and exhaust manifolds arranged to communicate with at least one gas retaining combustion chamber, said method comprising the steps of compressing the gas retained in said combustion chamber, discharging the gas into said intake manifold, returning the gas to said combustion chamber, compressing the gas in said combustion chamber, discharging the gas into said exhaust manifold, returning the gas to said combustion chamber, forming a closed chamber with said intake manifold and forming a closed chamber with said exhaust manifold prior to the step of discharging the gas into said intake manifold.

2. The invention of claim 1 further comprising the step of selectively directing pressurized gas to at least one of said closed chambers.

3. In a braking system in combination with an internal combustion engine having first and second cam shafts arranged for rotation and adapted to actuate engine exhaust and intake valves, control means operatively connected to said cam shafts for selectively rotating said first cam shaft relative to said second cam shaft whereby the timing of said first cam shaft may be advanced to increase the braking efficiency of said engine, intake and exhaust manifolds communicating with said engine and means operatively associated with said manifolds for selectively closing them and for selectively rotating said first cam shaft.

4. The invention of claim 3 further comprising means for selectively directing pressurized gas to at least one of said closed manifolds.

5. The invention of claim 4 wherein said further means is responsive to said means.

6. The invention of claim 3 wherein said last mentioned means comprises a control valve means arranged to selectively actuate first and second valve means to close said intake and exhaust manifolds, respectively, and further arranged to actuate the control means operatively connected to said cam shafts prior to when said first and second valve means are actuated whereby the timing may be precisely advanced prior to the time said intake and exhaust manifolds are formed into closed chambers.

7. A braking system in combination with an internal combustion engine having an intake manifold, an exhaust manifold, and first and second valve cam shafts mounted for rotation therein, said system comprising valve means for selectively forming said manifolds into closed chambers and means for selectively rotating said first cam shaft a predetermined amount relative to said first cam shaft whereby braking efficiency of the engine may be increased.

8. A braking system in combination with an internal combustion engine having intake and exhaust manifolds communicating therewith and first and second cam shafts mounted for rotation therein, said system having a mechanism for advancing the timing of said first cam shaft relative to said second cam shaft, said mechanism comprising a rotatable bushing connected to said first cam shaft, restraining means for preventing axial movement of said bushing and said second cam shaft, a shaft mounting said bushing thereon by a helical spline connection formed therebetween, said shaft mounted in said mechanism for limited reciprocating movements therein, a straight spline connection mounting a ring gear on said shaft to permit limited axial movement of said shaft relative to said ring gear, restraining means for preventing axial movement of said ring gear, an intermediate gear mounted for rotation on said bushing, a coupling operatively connecting said ring and intermediate gears, a driven gear in meshed relationship with said intermediate gear and operatively connected to said second cam shaft to impart rotary motion thereto, and control means for selectively imparting axial movement to said shaft for advancing the timing of said first cam shaft, said last-mentioned means comprising a piston assembly having a spring biasing a plunger thereof, said plunger being operatively connected to said shaft, said piston assembly forming a chamber adapted to retain a pressurized fluid therein for actuating said plunger, a pressurized fluid source communicating with said piston assembly, a control valve means for selectively permitting said pressurized fluid to flow into the chamber of said piston assembly for actuating the plunger of said piston assembly or for relieving the pressure in said chamber, first and second normally opened gate valve means operatively secured to said intake and exhaust manifolds, respectively, and communicating with said fluid source through said control valve means for selectively closing said manifolds when said piston is actuated.

9. The invention of claim 8 further comprising means operatively associated with at least one of said gate valve means and the closed manifold which is secured thereto for increasing the air pressure in said manifold in response to a closing of said gate valve means.

References Cited by the Examiner

UNITED STATES PATENTS

| | | | |
|---|---|---|---|
| 934,762 | 9/1909 | Saurer | 123—97 |
| 1,331,787 | 2/1920 | Schlatter | 123—90 |
| 1,358,187 | 11/1920 | Brewer | 123—90 |
| 1,624,525 | 4/1927 | Beach | 123—97 |
| 1,679,367 | 8/1928 | Meysenburg | 123—97 |
| 1,706,861 | 3/1929 | Pokorny | 123—119 |
| 1,947,996 | 2/1934 | Loeffler | 123—97 |
| 2,074,651 | 3/1937 | Huffman et al. | 123—97 |
| 2,685,281 | 8/1954 | MacGregor | 123—90 |
| 2,787,987 | 4/1957 | Portmann | 123—97 |

MARK NEWMAN, *Primary Examiner.*

FRED E. ENGELTHALER, *Examiner.*